United States Patent [19]

Seckler et al.

[11] 4,018,899
[45] Apr. 19, 1977

[54] PROCESS FOR RECOVERING FEED PRODUCTS FROM ANIMAL MANURE

[75] Inventors: David W. Seckler; Judson M. Harper, both of Fort Collins; William Wayne Gaynor, Atwood, all of Colo.

[73] Assignee: Ceres Ecology Corporation, Denver, Colo.

[22] Filed: Jan. 22, 1975

[21] Appl. No.: 542,968

Related U.S. Application Data

[63] Continuation-in-part of Ser. No. 388,902, Aug. 16, 1973, Pat. No. 3,875,319.

[52] U.S. Cl. .................................. 426/55; 426/657; 426/658; 426/431; 426/455; 426/495; 426/506; 426/807; 210/66; 210/73 R
[51] Int. Cl.² .................................... A23K 1/00
[58] Field of Search ............... 426/49, 55, 478, 489, 426/490, 492, 495, 506, 807, 657, 658, 431, 455; 210/65, 16, 73, 74, 69, 298, 396

[56] References Cited

UNITED STATES PATENTS

| | | | |
|---|---|---|---|
| 2,013,634 | 9/1935 | Norquist | 210/298 |
| 3,375,116 | 3/1968 | Anthony | 99/2 |
| 3,545,977 | 12/1970 | Stahler | 99/7 |
| 3,550,524 | 12/1970 | Brumagim | 99/235 |
| 3,773,659 | 11/1973 | Carlson | 210/7 |
| 3,774,770 | 7/1971 | Sparham | 210/298 |
| 3,838,199 | 9/1974 | Coe | 426/55 |
| 3,875,319 | 4/1975 | Seckler | 210/74 |

FOREIGN PATENTS OR APPLICATIONS

| | | | |
|---|---|---|---|
| 86,751 | 1971 | Germany | 426/807 |

*Primary Examiner*—Hiram H. Bernstein
*Attorney, Agent, or Firm*—Darby & Darby

[57] ABSTRACT

A process and apparatus for recovering feed products from animal manure are disclosed wherein the manure is fractionated into a silage component, a high-protein feed supplement, and a third component consisting essentially of insoluble minerals and indigestible cellulosic particles. A slurry of the incoming manure is formed and allowed to ferment to encourage the bacterial conversion of nitrogenous compounds into true protein and to lower the pH of the slurry. Special separators are used to separate the fermented slurry into solid and liquid fractions. The solid fraction which consists of undigested fibers and grains is washed to provide the silage type component. Insoluble minerals and indigestible cellulosic particles of the manure which appear in the liquid fraction as fine solids are removed from the liquid fraction (by centrifuging) to provide the third component. The viscous liquid fraction may be used as a high-protein feed supplement or the water in it can be evaporated to provide a dry product.

32 Claims, 6 Drawing Figures

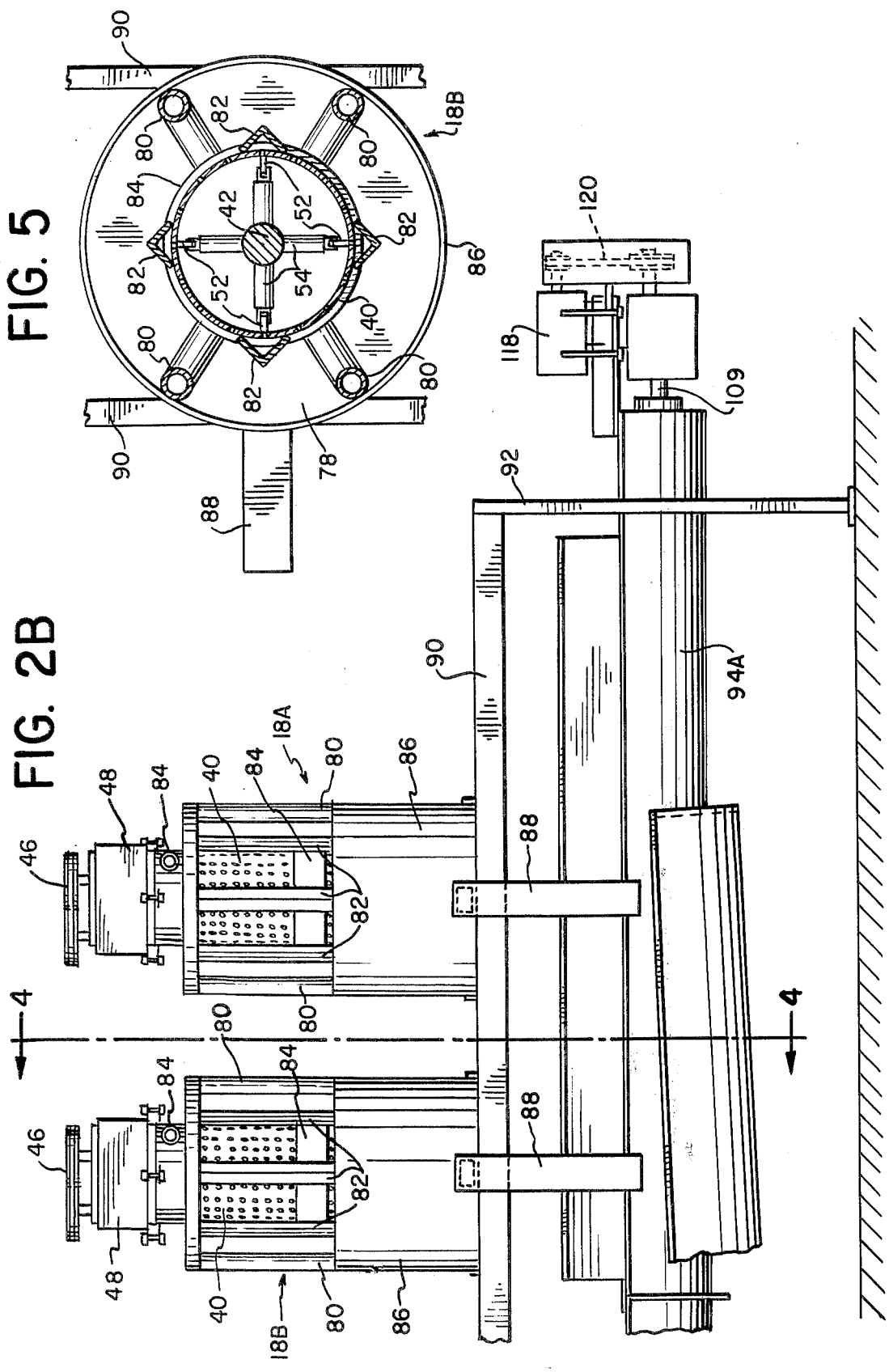

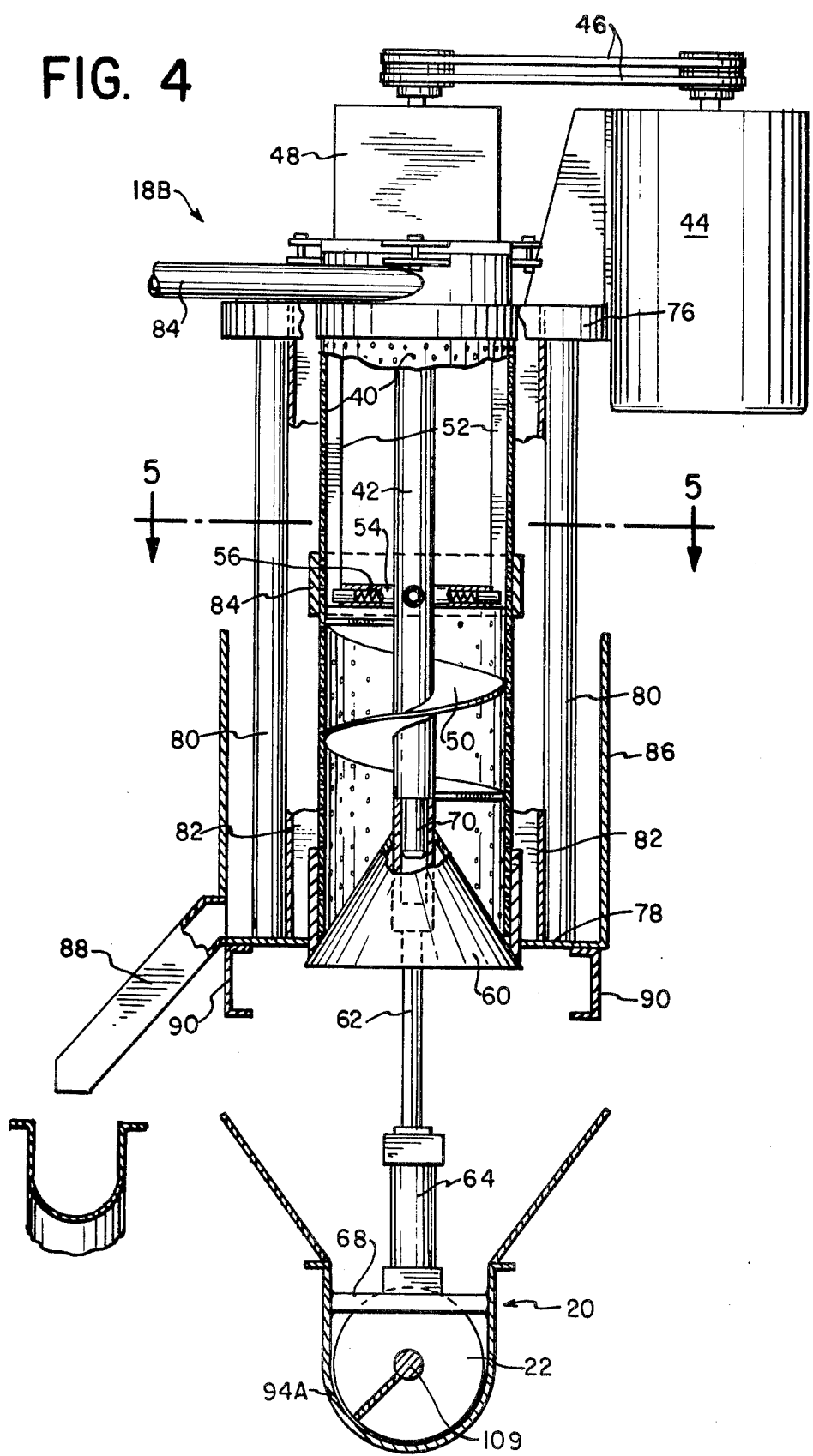

PROCESS FOR RECOVERING FEED PRODUCTS FROM ANIMAL MANURE

This is a continuation-in-part of U.S. patent application Ser. No. 388,902 filed Aug. 16, 1973 in the names of David W. Seckler and Judson Harper and entitled PROCESS AND APPARATUS FOR RECOVERING FEED PRODUCTS FROM ANIMAL MANURE, now U.S. Pat. No. 3,875,319, (hereinafter referred to as the Seckler patent).

This invention relates to a process and apparatus for recovering animal feed products from animal manure.

The Seckler patent discloses and claims a feed recovery process which is improved with respect to a basic process disclosed in U.S. Pat. No. 3,375,116 of Brady W. Anthony (hereinafter referred to as the Anthony patent). The Anthony patent discloses a process for washing undigested grains and fibers from animal manure and, thereafter, recovering valuable nutrients (principally protein) from the wash water to provide a high-protein feed supplement in addition to the silage-like fiber and grain component. Much of the valuable fecal protein is non-dietary (i.e. not consumed by the animal but produced during the digestive process) and appears as minute microbial (or microbiological) entities which are difficult to extract.

The Seckler patent pertains to a countercurrent recycling process for extracting these silage and protein components requiring substantially less water than the Anthony process and capable of use on a commercial scale with large feedlots containing in excess of ten thousand cattle (for example).

Both the Anthony and Seckler patents describe in detail the problems associated with accumulation of great quantities of manure and the reasons why there currently exist strong incentives to "recycle" manure by recovery of the valuable feed products which are inherent in the manure. To the extent these considerations are relevant to the invention disclosed in this application, the disclosures of application No. Pat. No. 388,902 and the Anthony patent are hereby incorporated by reference.

The present invention concerns a process which also is primarily intended to extract a silage-type feed component (comprising essentially undigested grains and fibers) and a high-protein feed supplement from animal manure. The process of the invention is more economical than previously known processes and produces a protein feed supplement having a higher nutrient value than that of the protein supplement extracted by known processes.

Briefly, in accordance with the invention, a process for extracting digestible material from animal manure comprises the steps of forming a slurry of manure and water and separating the slurry into solid and liquid fractions, the solid fraction comprising a silage-like mixture of undigested fibers and grains. Most insoluble minerals and indigestible cellulosic particles are then separated from the liquid fraction after which soluble and insoluble nutrients may be removed from the remaining portion of the liquid fraction to provide a high-protein feed supplement. It is contemplated that the liquid fraction, with suitable processing, may be used directly as a feed product.

The process is essentially a continuous one with improved economy of operation provided by special liquid-solid separating techniques which permit the use of reduced quantities of water. As explained in detail below, removal of the indigestible minerals and cellulosic particles (as a third fraction or component) from the liquid fraction prior to extraction of the protein increases the energy content of the high-protein supplement. This third component has value as a soil conditioner and its extraction further enhances the commercial value of the overall process.

The invention is described in detail below with reference to the annexed drawings, wherein:

FIG. 1 is a flow diagram showing a process for extracting feed products from manure in accordance with the preferred embodiment of the invention;

FIGS. 2A and 2B comprise a front view, partially in section, of a preferred separator and washing mechanism;

FIG. 4 is a sectional view along the line 4—4 of FIG. 2B; and

FIG. 5 is a sectional view along the line 5—5 of FIG. 4.

Figure 1:
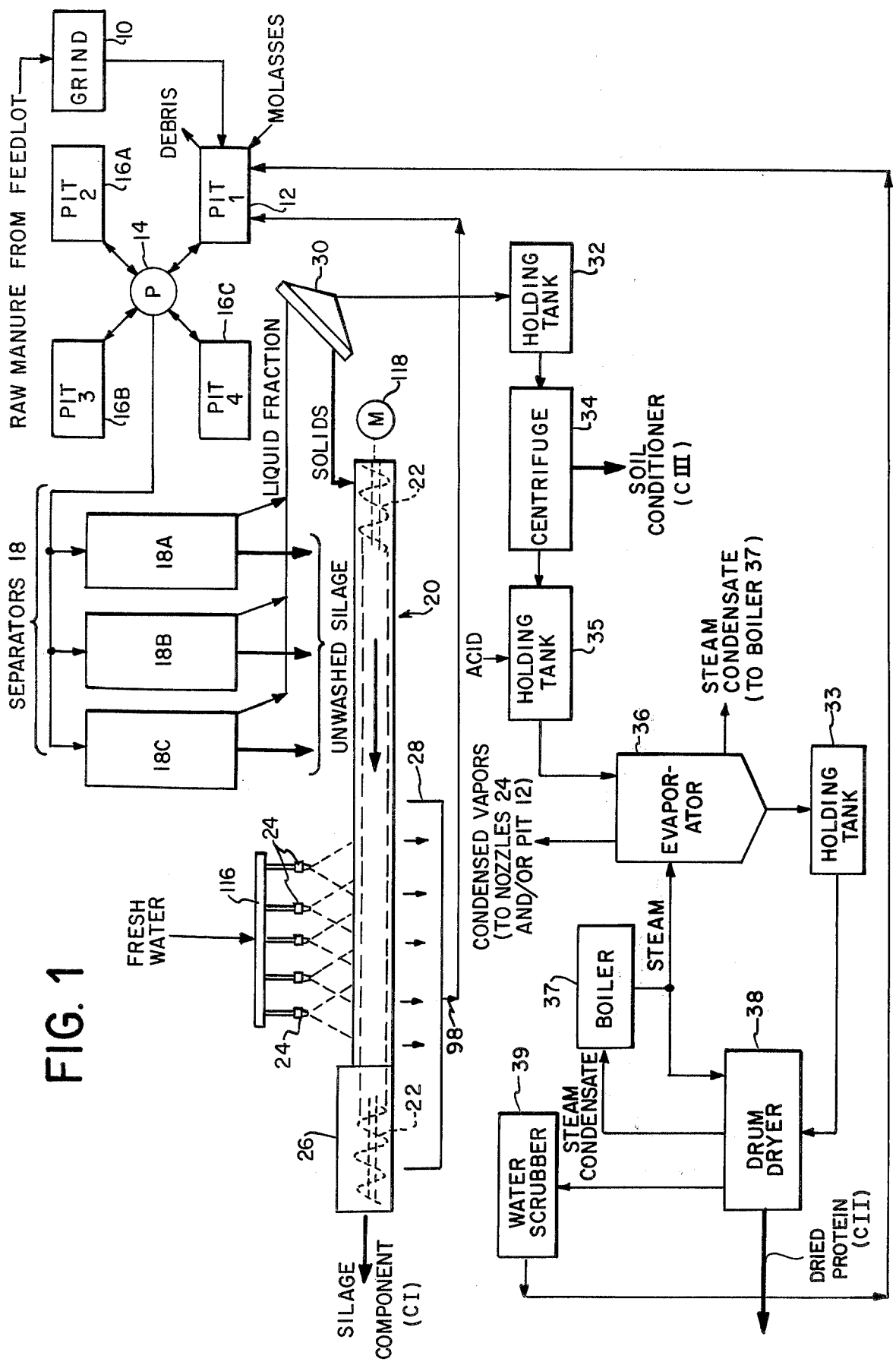

Reference will be made herein to solid and liquid fractions of the slurries which exist in the process although such fractions are neither entirely dry nor entirely liquid. The liquid fraction is actually a slurry of water and fine solids (primarily colloidal), and includes also most of the soluble material. The solid fraction consists of wet solids (e.g. coarse fibers and grains). Accordingly, in the following specification and claims, the terms "liquid fraction" and "solid fraction" are to be regarded as relative terms intended to distinguish between two components of a slurry. Depending upon the particular separating process, the amount of solids contained in the liquid fraction (and vice versa) will vary. In the drawings the flow of solid fractions is shown in heavier lines than the flow of liquid fractions.

The invention is described with reference to the flow diagram of FIG. 1 which shows diagrammatically the various steps of a preferred process. Much of the apparatus used to perform these steps may be commercially available equipment and, therefore, is not described in detail.

Referring to FIG. 1, raw manure recovered from an animal feedlot is ground by a hammer mill or other suitable device 10 and then conveyed in any suitable fashion to a first slurry pit 12 in which fermentation of the manure is started. The hammer mill 10 shreds the raw manure to divide lumps of manure into its constituent particles, without substantial grinding of the particles, and thus aids in the subsequent slurrying steps. Preferably, the feedlot will have a concrete floor to minimize contamination but, obviously, the invention may be used with any type of feedlot or other confinement. Typically, the manure is gathered every four to ten days depending on climatic conditions which affect decomposition.

A slurry is formed in the first pit 12 as described below, the slurry in one preferred embodiment comprising about 26 percent dry matter and about 74 percent water. The amount of water in the raw manure collected from the feedlot may vary substantially (for example, from about 50 percent to about 80 percent) and, therefore, the amount of water to be added to pit 12 will vary accordingly. For example, the amount of water added to slurry pit 12 may vary from none to about 3 pounds of water for each pound of raw manure.

Pit 12 may be provided with a suitable agitator (not shown) which serves to mix the slurry to an approximately uniform consistency. The agitator may be of the propeller type or any other conventional type used in analogous applications.

This first slurry pit 12 desirably has a sloped floor for access by a tractor for cleaning purposes. Rocks and other similar debris which may have been picked up with the manure will settle toward the lowest point of the pit. Typically, the manure will be held in the first pit 12 for about 1 day which is long enough to cause fermentation of the manure to start. Fermentation encourages the growth of micro-organisms which convert nitrogen and carbon into true protein (sometimes referred to as single cell protein). The start of fermentation may result in a reduction of the pH of the slurry from about 6 to about 5.5 in pit 12. The addition of molasses or other readily fermentable carbohydrate to the slurry in pit 12 has been found to aid materially in the conversion of non-protein-nitrogen compounds into true protein because manure is relatively low in readily fermentable carbohydrates. For example the addition of up to 2% molasses on a dry weight basis may increase the true protein more than 50%.

The agitation of the slurry in pit 12 should be great enough to ensure uniformity or homogeneity of the mixture while disintegrating manure conglomerates yet not so great as to prevent settling of debris including relatively fine sand-like particles. Such debris will settle to the sloped bottom of the pit where it can be removed conveniently and periodically. Because the preferred process is largely mechanical and relies on physical separating means having moving parts as described below, early removal of this abrasive debris results in smoother operation of the separating devices, reduced maintenance, and increased operating lives of the machines.

After about one day, the fermented slurry in the first pit 12 is pumped by a commercially available manure pump 14 (with suitable valve means) to one of three operating pits 16A, 16B and 16C. Each of these operating pits (which may be made of concrete) should have a capacity sufficient to hold all of the manure produced in one day by the feedlot for which the system was designed. The operating pits 16A, B and C are emptied successively so that the manure slurry will ferment on the average for about 3 ½ days. This fermentation preferably results in a reduction of the pH of the manure slurry to about 4.8 when molasses is added.

As the contents of the first pit 12 are emptied into one of the operating pits 16, the pit 12 is filled with additional slurry for initial processing and then fermentation through another operating pit.

When fermentation of the slurry has reached the desired point, the pump 14 feeds the fermented slurry from the selected operating pit to a liquid-solid separator 18. As shown diagrammatically in FIG. 1, separator 18 may comprise three separate separating devices 18A, 18B and 18C operating in parallel to provide the capacity required.

The preferred embodiment of the invention uses special separating devices, described below, which are capable of separating a manure slurry in a very thick state (e.g. of about seventy percent water content) into solid and liquid fractions. The solid fraction from the separators 18A, B and C falls directly into a washing trough 20 arranged directly beneath the separators.

Washing trough 20 includes an elongated auger 22 which propels this solid fraction from the manure slurry from right to left as viewed in the drawing beneath a set of nozzles 24 which emits a stream of fresh water to cleanse the fiber and grain particles comprising the silage component. The continuous movement of auger 22 propels the cleansed wet silage component to a press 26 which reduces the moisture content of the silage component to between 50% and 55% (for example). This silage component is then removed from the outlet of the press by suitable conveyor means (not shown) and further processed if desired (see, for example, application U.S. Pat. No. 388,902) to provide one of the desired feed products.

As shown diagrammatically in FIG. 1, a small tank 28 is arranged beneath the washing section of the trough 20 and the press 26 to receive the excess water from these portions of the system. This water, which contains substantial quantities of valuable nutrients, is recycled back to the first slurry pit 12 to bring the moisture content of the slurry within the first pit up to the desired level. In effect, a second water-manure slurry is formed in trough 20 with the liquid-solid separation occuring as the slurry is conveyed by auger 22 to press 26.

Ideally, fresh water is only added to the system through the nozzles 24. This fresh water effectively cleans the silage component with the amount added being dependent upon the desired moisture content of the initial slurry in pit 12. As explained below, it is generally desirable to maintain this slurry at a relatively low moisture content. Therefore, if, because of environmental conditions, excessive moisture is present in the incoming manure, minimum quantities of fresh water should be introduced through nozzles 24. In such cases, it may even be necessary to dispose of a portion of the excess wash water to maintain production costs within acceptable limits. Such extess water may be used for irrigating purposes. In practice, where the incoming manure is dry, it may also be necessary to add water to the slurry in pit 12.

The liquid fraction from the separators 18A, 18B and 18C may be fed over a vibrating screen 30 which serves as a supplemental separator to remove some of the coarse undigested grains and fibers which may have passed through the separator 18 with the liquid fraction. These digestible solid materials fall from the vibrating screen 30 and can be fed back into the washing trough 20 by a suitable conveyor (not shown) where they are propelled by auger 22 with the solid fraction from separator 18 under the nozzles 24 and through the press 26. Thus, these solid materials from the screen 30 become part of the silage component.

The liquid fraction from the vibrating screen 30 at this point will include soluble nutrients and minerals as well as the microbial solids which constitute the digestible nutrients to be recovered and indigestible minerals and cellulosic particles (principally lignin and hemicellulose). The moisture content of the liquid fraction may be about 80%. It will appear as a viscous liquid with the nutritious microbial solids in a colloidal suspension with most indigestible minerals and cellulosic particles entrained in the liquid. This liquid fraction from vibrating screen 30 is fed to a holding tank 32.

The vibrating screen may be omitted, in which case the liquid fraction from the separators 18 is fed directly to holding tank 32.

Some of the minerals in the liquid fraction are part of the animal feed and are valuable. They are usually soluble and, therefore, in true solution in the liquid fraction. Retention of these minerals is desirable since the digestible minerals enhance the value of the feed supplement.

The indigestible minerals in the manure may be picked up in part as contaminants (sand, clay, etc.) from the feedlot floors if the cattle have access to dirt, especially when the manure is gathered from only a partly concreted surface. Studies have indicated that lignin and hemi-cellulose (which are indigestible) tend to become more heavily concentrated as fiber particle size decreases (i.e. digestibility of fiber particles varies inversely with particle size). Hence, the liquid fraction remaining after extraction of the silage component contains sizable amounts of these indigestible minerals and cellulosic particles.

A principal feature of the process according to the invention resides in the removal of a substantial amount of these insoluble minerals and indigestible cellulosic particles from the liquid fraction. It has been discoverd that where these indigestible materials appear, their presence in manure can produce serious problems when feed products are extracted from the manure.

For example, since cattle tend to digest about seventy-five percent of their feed, any indigestible material in the feed will appear in the manure at four times that concentration. Normally, cattle feed contains about 8% indigestible material which means that the manure from animals fed this ration will contain about 26% indigestible materials. If feed products from such manure are extracted with this indigestible material in them and fed to these or other animals, the amount of indigestible material in the manure will increase, and if the manure from these animals is used as a source of the feed products, the amount of indigestible material in the manure will gradually built up to an excessive level (e.g. above about 50%) where extraction of the nutrients may not be commercially feasible.

Furthermore, even where the amount of indigestible material in the manure is substantially less than 50 percent, the feed products which are produced from such manure will contain relatively high levels of indigestible materials which dilutes the nutritive value of the feed for this and other reasons. For example, the insoluble ash constituents are extremely abrasive and may result in serious damage to the moving parts of a feed extracting system such as centrifuges, pumps, and dryers.

Accordingly, the liquid fraction from holding tank 32 is fed to a low-speed centrifuge 34 which separates a substantial amount of the insoluble minerals and indigestible cellulosic fiber particles from the microbial nutrients within the liquid fraction from the separators 18 and 30. For the most part, these indigestible materials are larger and denser than the microbial nutrient particles which are primarily water. Because of this difference in density, a centrifuge can extract the denser materials. However, since some of the denser materials have nutrient value and some of the microbial particles are indigestible, separation of the indigestible materials and nutrients is not complete.

The removal of the indigestible materials in the centrifuge depends in part on the retention time of the liquid in the centrifuge, the type of centrifuge, and the centrifugal force applied. Using an imperforate basket type centrifuge with retention time between about 1 minute and 30 seconds and centrifugal force between 500 and 1200 g's, experiments have shown that more than half of the above-identified indigestible materials can be removed. This removal of indigestible materials not only upgrades the feed value of the high protein supplement, it also serves the important function of "bleeding out" of the system materials (such as heavy metals, indigestable plant residues and, possibly, drug residues) which, if allowed to accumulate, could become harmful to animals and dilute the value of subsequent feed products derived.

It is possible that heating the liquid fraction may aid in extracting these indigestible materials. It may be possible to use other separating techniques, such as screening and filtration, instead of centrifugation.

The indigestible materials removed as the centrifuge cake may be sold for use as a high quality soil conditioner. The centrifuge supernatant, which now constitutes the liquid fraction, is a viscous liquid (85% moisture, a pea-soup like consistency) including the desired nutrients partly in colloidal suspension and partly in a true solution. This viscous liquid is pumped to a holding tank 35 where about 0.5 to 1% sulfuric acid (for example) on a dry weight basis may be added. Some of the important soluble nutrients such as peptides, free amino acids, and non-protein nitrogen are relatively volatile and may escape from the system during drying. Sulfuric acid will lower the pH of the liquid fraction to approximately 4.0 and reduces loss of nitrogen during the drying process through formation of less volatile salts with nitrogeneous compounds. The addition of acid further reduces the viscosity and adhesive characteristics of the liquid fraction. Hence, the liquid is less sticky and can be concentrated to a greater extent in an evaporator without causing severe mechanical handling problems during evaporation and drying, as described below. This saves fuel costs of drying since the thermal efficiency of the vacuum evaporator is approximately 50% greater than that of the dryer.

Because the initial slurry has a relatively low moisture content, the protein may be extracted economically from the liquid fraction by evaporation and drying. Thus, the liquid fraction from tank 35 is fed next to an evaporator 36 where, for example, the moisture content may be reduced from about 85 percent to about 60 percent.

Evaporator 36, in the preferred embodiment, is a commercially available evaporator specifically designed to handle viscous liquids and to remove water from them. The viscous liquid from holding tank 35 enters the evaporator and a vertical rotating element inside the evaporator throws this liquid to a vertical cylindrical heat transfer surface of the evaporator. The rotating inner element keeps the material in a thin film and gravity causes it to flow down the evaporator heat transfer surface. Steam provided by a boiler 37 flows through an external jacket enveloping this heat transfer surface, and heats it so that water evaporates from the liquid fraction as it falls. The concentrated material is removed from the bottom of the evaporator by an appropriate pump (not shown). The evaporator is a vacuum evaporator in that it operates at less than atmospheric pressure.

The condensed working steam from evaporator 36 may be returned to the boiler 37. A portion of the condensed not vapors may be used to wash the silage component by recycling it through the nozzles 24 or the condensate may be returned to the initial slurry pit 12. The use of the hot condensate to wash the silage fraction through nozzles 24 will aid in the washing process.

The concentrated liquid fraction from evaporator 36 is a very viscous liquid. As explained in further detail below, this concentrated liquid fraction may be used directly as a feed product or it may be further concentrated in a dryer 38 to provide a solid feed product. In the preferred embodiment of the invention, the dryer 38 is a commercially available drum dryer comprising two rotating heated drums on which is spread the viscous liquid fraction from a holding tank 33, which receives the concentrate from evaporator 36. The drums of dryer 38 may also be heated by steam from boiler 37 with the steam condensate recycled with the working steam condensate from evaporator 36 as previously described.

The dried protein forms a thin crust on the rotating drums of dryer 38 and is scraped off by suitable doctor knives as a solid flake-like material with a moisture content of about 10 percent (for example).

It may be desirable to raise the pH of the liquid fraction from evaporator 36 prior to drying to simplify handling of the viscous liquid on the dryer drums. This will also reduce corrosion in the drum exhaust and may provide collateral benefits with respect to feed composition. For example, the addition of ammonium to raise the pH of the liquid fraction to about five will cause the formation of ammonium sulfate (if $H_2SO_4$ is the acid used), which is a useful source of nitrogen for ruminants.

If the high protein feed supplement is to be fed to chickens, phosphoric acid may be added to tank 35 in place of sulfuric acid and the liquid fraction neutralized with calcium carbonate after evaporation. This will form dicalcium phosphate which is a standard additive of chicken feed.

The dried material produced by the dryer 38 constitutes the high protein component. It may be pellitized in a standard pellet mill or processed in any suitable fashion, for example, as described in application U.S. Pat. No. 388,902. The exhaust of dryer 38 may be fed to a wet (or dry) scrubber 39 which, for environmental purposes, aids in removal of pollutants from the exhaust. This heated liquid from the water scrubber will be laden with protein dust and may be fed back to the first slurry pit 12 to hold these nutrients in the system.

Dryers other than drum dryers, for example, spray dryers or rotary dryers, may be employed as the dryer 38.

The silage and high protein feed components may be processed in various ways before being fed back to livestock. For example, the silage component from press 26 may be tumbled through an open flame to burn off the animal hair which is present in it. After the hair has been burned off, the remaining product which is about 60% dry matter (because of partial dehydration) may be passed through an air separator, screen, or other suitable device to separate the grain particles from the fiber particles. The grain particles can constitute a high-energy feed and be fed back directly to the animals in the feedlot. The fiber particles may be mixed with various feed supplements and then fed back to the animals, or used as a soil conditioner.

It is not necessary that the hair be removed, and the silage component (with or without hair removal) is most desirably mixed with molasses or another readily fermentable carbohydrate such as sugar, and fermented to improve palatability, storability, and shelf life in the feed bunks. Alternatively, the fermented product may be dehydrated, mixed with other feed ingredients, and pellitized before being fed back to the animals.

The dried protein component from the dryer 38 may similarly be treated in any desired way prior to its use as feed. It may be mixed with other feed ingredients and pellitized by standard means.

As indicated previously, a principal benefit of the invention resides in the reduction of water requirements and, consequently, a lower cost in removing water by evaporation and drying. It is also contemplated that the high-protein feed supplement may be used in its viscous liquid state. Particularly, in the case of relatively small installations (for example, in the order of 1,000 head of cattle), complete extraction of the nutrients from the liquid fraction may not be commercially feasible. Accordingly, the viscous liquid fraction from centrifuge 34 or, preferably, evaporator 36 may be fed directly to animals.

In practice, the thickened liquid fraction may be blended with molasses (or other fermentable carbohydrate) and ammonia (to regulate pH values and nitrogen content), and then mixed with alfalfa hay (or other such feed product) in any suitable blender to provide a semi-solid matrix. This mixture may then be conveyed into a sealed silo for approximately 4 to 10 days of anaerobic fermentation. The fermented liquid fraction may constitute about 10% by weight of the total feed product. The resultant product has acceptable odor, similar to that of the alfalfa silage, and like common silage, has no free water which would tend to contaminate other feeds with which it may be mixed.

Moreover, because the liquid fraction from the centrifuge 34 contains substantial quantities of naturally selected bacteria and enzymes, the liquid can be mixed with waste products such as corn stalks, beet tops, sugar cane bagasse, and other such crop residues, which are normally discarded. It is believed that the presence of these bacteria and enzymes may tend to partly "pre-digest" these largely indigestible residues, thereby upgrading their value as feed products.

Since the viscous liquid fraction, after removal of indigestible minerals and cellulosic particles, may itself constitute the high protein feed supplement, reference in the specification and claim to "extracting" nutrients from this liquid fraction should be deemed to include use of the liquid fraction without water removal as a feed supplement.

If the silage fraction from the press 26 is not adequately cleaned, a second set of nozzles identical to nozzles 24 may be added as a second washing station in "series" with the illustrated nozzles so that two separate washing operations occur. Fresh water is introduced through the nozzles at the second station with the excess liquid from the second station being fed back to the washing nozzles at the first station. The excess wash water from the first station is returned to the first slurry pit 12.

To aid in the separation of the indigestible minerals (ash) and cellulosic materials from the high-protein feed product in the liquid fraction from separators 18, the pH of the liquid fraction may be increased to a value between 6 and 7. This will tend to keep the nitrogenous compounds in solution as the ash component is removed. After centrifuging, the pH of the liquid fraction may then be lowered, as described with reference to FIG. 1, to cause these compounds to form less volatile salts with the acid. A high-speed centrifuge (with or without prior evaporation) may be a useful way to separate the nutrients from the remaining liquid.

The selection of the moisture content of the incoming manure slurry in pit 12 is important and requires the balancing of a number of considerations. The higher the moisture content, the easier it is to extract indigestible minerals and fibers from the liquid fraction. However, as the moisture content increases so does the cost of physically extracting microbial nutrients from the liquid fraction, even if water disposal problems can be overcome. For example, by reducing moisture content from 85 percent, to 70 percent the liquid-solid ratio is reduced to from about six to one to about two to one. Thus, if an evaporative separating process is used to separate the water from the microbial protein (as preferred), the energy requirements are reduced by a factor of about three.

On the other hand, at very low moisture levels it is almost impossible to separate adequately the solid and liquid fractions; moreover, at moisture contents of less than 70 percent fermentation does not occur readily and without fermentation the amount of true protein in the solution is materially lessened. Good experimental results have been obtained where the moisture content for the incoming manure slurry is about 70 to 74 percent. It is preferred that the moisture content be in a range between about 70 percent and 80 percent, but the invention is not limited to this range.

The reduction in moisture content of the incoming slurry is made possible by the special separating techniques and apparatus used in the preferred embodiment of the invention and shown in FIGS. 2–5 which illustrate the construction of the separator 18, the washing trough 20 and the press 26 shown diagrammatically in FIG. 1. This separating and washing apparatus has the capability of separating a manure slurry of relatively low moisture content into liquid and solid fractions thus essentially separating the silage type component from the high-protein nutrients in the wash water.

Figure 2A:
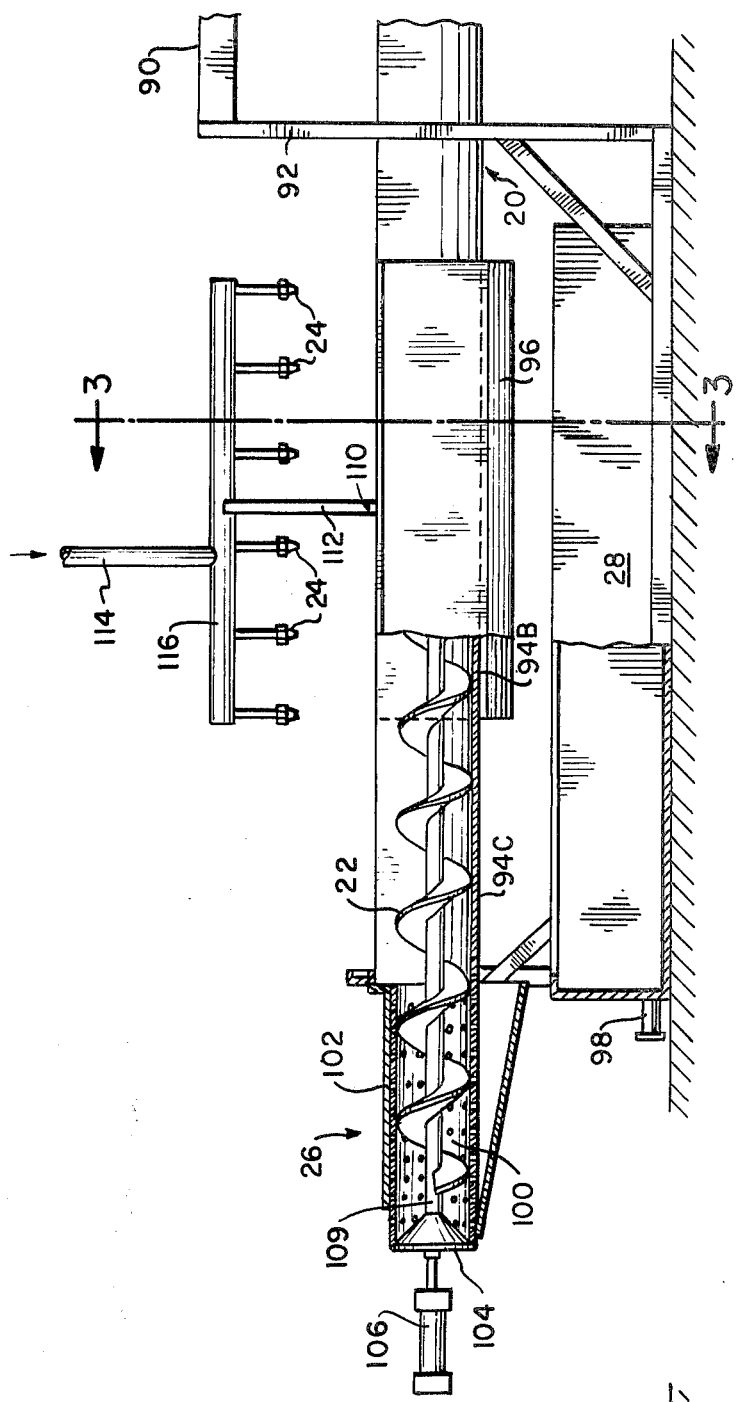

FIGS. 2A and 2B show two separators 18A and 18B arranged above the washing trough 20 with the auger 22 moving the solid fraction from right to left toward the silage press 26 at the extreme left-hand side of FIG. 2A.

Separators 18A and 18B are identical and only one is described in detail. Each separator comprises a cylindrical screen 40 and a central axle 42 (FIG. 4) which is driven by a motor 44, pulley 46, and a suitable gear train 48. The portion of axle 42 which extends through the cylindrical screen 40 includes a lower auger flighting 50 and four spring-loaded scraper knives 52 (see also FIG. 5) which rotate with auger 50 when axle 42 is rotated.

The scraper knives 52 are supported on respective pairs of hollow dowels 54 (the lower ones only being illustrated in FIG. 5), each of which includes an internal coil spring 56 biased against a bifurcated pin 58 to which the corresponding scraper knife 52 is secured. The coil spring 56 urge the scraper knives 52 against the inner surface of the cylindrical screen 40.

The bottom or exit end of the screen 40 is closed by a pneumatically controlled discharge cone 60 which is secured to a vertical piston rod 62. The piston rod 62 slides within a vertical cylinder 64 so that pneumatic pressure against the piston (not shown) forces the conical surface of the cone 60 toward the lower end of the cylindrical screen 40. The cylinder 64 is mounted on a bracket 68 extending across the washing trough 20. The upper end of piston rod 62 extends above the cone 60 and includes a suitably shaped opening for receiving a projection 70 from the lower end of axle 42 for rotatably supporting the axle. The opposite or upper end of axle 42 may be supported within a truss bearing 72 or the like to enable free rotation of the axle.

The separator construction as described may be mounted in any desired way. As shown most clearly in FIG. 4, upper and lower circular plates 76 and 78 are provided with four vertical struts 80 (see FIG. 5) providing mechanical support. Four vertical angle irons 82, L-shaped in cross section, extend between the plates 76 and 78 to provide further mechanical support for the screen 41 against which substantial pressure is applied by the manure slurry during the separating process. An external ring 84 centrally located provides further support for the screen 41.

The inlet for the manure is provided by a horizontal high pressure pipe 84 which introduces the slurry tangentially at the top of the screen 41. The lower plate 78 includes an upwardly extending collar 86 in which the liquid fraction collects prior to outlet through pipe 88 and a common channel 89.

The separators 18 are supported on horizontal channel bars 90 of a frame further including four upstanding vertical posts 92 suitably secured to ground. The washing trough 20 beneath the separators 18 includes three sections 94A, 94B and 94C (see FIGS. 2A and 2B). Section 94A of the casing is imperforate and is immediately beneath the separators 18A, 18B and 18C. The next section 94B beneath the nozzles 24 includes a perforated screen through which wash water from the nozzles 24 can fall into tank 28. The third section 94C is also imperforate and serves to guide the washed silage component into the press 26.

A pair of formed plates 96 (FIG. 3) extend downwardly from opposite sides of the casing section 94B to guide the liquid fraction or wash water into the tank 28. Tank 28 includes an outlet pipe 98 through which the liquid fraction is fed to the vibrating screen 30 of FIG. 1.

The press 26 includes a perforated screen 100 extending longitudinally from the open end of the last trough section 94C. Screen 100 may be mechanically supported on its sides and top by a funnel-like member 102 partially enveloping the screen and also serving to direct liquid pressed through screen 100 into tank 28. The outer end of the perforated screen 100 is enclosed by a closure cone 104 urged pneumatically against the end of the screen 100. The auger may be driven by conventional means such as a motor 118, pulley 120 and gear train 122 shown mounted at the right-hand end of trough 20.

Figure 3:
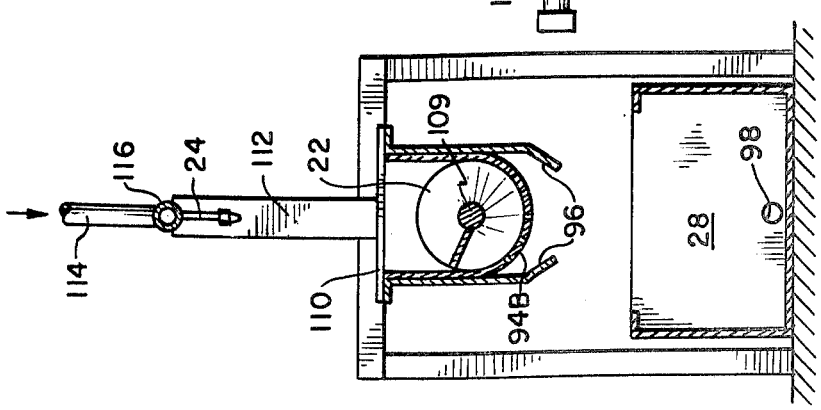
FIG. 3 is a sectional view along the line 3—3 of FIG. 2A.

The support for the nozzles is shown most clearly in FIG. 3. It comprises a horizontal brace 110 across the deflecting plates 96 above the trough washing section 94B. A vertical brace 112 extends upwardly supporting a water pipe 116 from which the nozzles 24 extend downwardly. Water is fed to the pipe 116 to an inlet 114 from any suitable source.

The separators 18A and 18B are specially adapted for separating a viscous fluid into its liquid and solid fractions. In operation, the viscous manure slurry is fed under high pressure (e.g. about 35–40 psi for a slurry with a 70 percent moisture content) through the high pressure inlet 84 into the cylindrical screen 40. The tangential feed is important since it equalizes separation as described below around the periphery of the screen. The screen 40 may be one-sixteenth inch thick mild steel with holes five sixty-fourth inch in diameter. Preferably the screen holes define horizontal "rings" perpendicular to the axis of rotation. This will cause the rotating knives 52 to become serrated during use which improves their cleaning action since the serrations will more readily unplug any filled holes.

The size of the holes in screen 40 determines the contents of the silage component and will be selected depending in part on the type of feed fed to the animals. Where ground grains are fed, the screen openings will ordinarily be in the order of about five sixty-fourth inch in diameter.

The high pressure of the incoming slurry forces the liquid fraction through the holes of screen 40. However, the solid fraction within the screen tends to plug the holes. The rotating knives 52 continuously clean these holes so that the separating process can continue with the liquid fraction flowing through the screen.

Most of the separation between the liquid and solid fractions takes place in the volume occupied by the four spring-loaded knives. As the liquid is removed by the separator, the solid fraction including the fibers and grains becomes more concentrated. This increased concentration of fibers and grains is forced down into the auger 50. In the auger section, the holes of the screen 40 tend to clog creating a friction surface which helps to bind the grains and fiber material in this section. This permits the auger 50 to function as a screw press.

The pressure applied to the solid fraction is determined by the back pressure applied to the discharge cone 60. It is important that the fibers and grain in the manure slurry build up a "seal" around the periphery of discharge cone 60. If the high pressure on the inlet side cause the seal to "blow out", the liquid fraction will fall through the end of the screen resulting in inadequate separation. In experiments, satisfactory results have been achieved by applying a force of about 700 pounds to discharge cone 60.

In the preferred operation the knives 52 have a peripheral velocity of about 8–10 ft/pec. If the knives move too quickly they tend to pass over the material in the holes and fail to clean the screen. If the speed is too low the capacity is cut. The separator has been optimized for moisture contents down to 70 percent.

The liquid fraction squeezed through screens 40 of the separators is directed by channel 89 and suitable pumping means (if necessary) to vibrating screen 30 or the holding tank 31.

The solid fraction is forced slowly through screen 40 around the periphery of cone 60 so as to maintain the required back pressure. This fraction drops into trough 20 where it is conveyed by auger 22 beneath nozzles 24 to press 26. Discharge cone 104 applies the force (e.g. in the order of 700 pounds) to compress the cleansed silage component which, after it is forced past the cone 104, drops onto a conveyor (not shown) for removal.

Obviously, design considerations for the machines which comprise the various parts of the system will vary substantially depending upon numerous factors and practical considerations. In the following, certain of these general considerations are stated for a system capable of processing the manure from 7,000 head of cattle under the assumption that the incoming manure has a moisture content of about 80%. In practice, this is higher than it will ordinarily exist and the process is fully capable of handling manure having an incoming moisture content of between 70 and 74 percent which is preferred for economic reasons.

For the theoretical example under consideration, the total weight of the manure to be processed will be approximately 343,000 pounds per week. The following figures are given on the assumption that all of the manure produced by the feedlot is to be processed in a five-day work week.

For the example, the fermentation pits 12 and 16 may have a capacity of 6,250 cubic feet. The slurries in these fermentation pits, if the incoming manure is at 80% moisture, will be maintained at the same moisture content. Less than 1% by weight of molasses on a wet weight basis will be added to the manure in the tank 12. Fermentation will proceed for a period of about three and one-half days, at which time the pH level is about 4.8.

The slurry is pumped to the separators 18 at a rate of about 51 gallons per minute. At this rate, the separators will operate for about 16 hours per day. In this period, approximately 2,150 pounds of the silage component CI at a moisture content of 60% will be produced. The silage content will be washed in the trough 20 with water fed through the nozzles 24 at a rate of about 2 gallons per minute.

The liquid fraction from the separators 18 will be drawn at a rate of about 46 gallons per minute with a moisture content of about 82.2%. For purposes of this example, the vibrating screen 30 is bypassed. The holding pit 32 may have a capacity of 2,050 cubic feet and the liquid fraction will be pumped from this holding pit 32 at a rate of about 31 gallons per minute and the same moisture content.

The centrifuge 34 will extract, as its cake, indigestible minerals and cellulosic particles with a moisture content of about 60 percent. This portion of the system will operate continuously and produce about 2,860 pounds of this mostly indigestible fraction in about 24 hours.

The supernatant from the centrifuge 34 at a moisture content of about 88.6% will be pumped at a rate of about 24 gallons per minute to the holding tank 35 which may have a capacity of about 970 cubic feet. The viscous fluid in the holding tank 35 will be pumped to the evaporator 36 also at a rate of about 24 gallons per minute. Holding tank 33 which receives the concentrated liquid fraction from evaporator 36 serves as a surge tank for the drum dryer and may have a relatively small capacity of about 405 cubic feet. The moisture content of this material will be about 75 percent and it will be pumped to the drum dryer at a rate of about 11 gallons per minute.

The dried protein component from the dryer 38 will have a moisture content of about 10 percent and about 1,270 pounds will be produced in a 24 hour period.

Boiler 37 may be a 350 hp boiler with a capability of 100 psi minimum.

The process as illustrated and described herein has been designed for use with steer manure but the same basic principles may be used to extract feed products from the manure of monogastric animals such as pigs and chickens as well as other ruminants, such as sheep.

Experiments in processing swine manure with the process of FIG. 1 indicate that swine manure may even be a more valuable source of livestock feed than cattle manure. On the other hand, swine manure contains high quantities of moisture (for example about 85%), is even more difficult to handle than steer manure, and has a particularly noxious odor. It may therefore be desirable to aerobically ferment the liquid fraction from centrifuge 34 after removal of indigestable material to reduce the odor. It may also be advantageous instead of processing pure swing manure to mix quantities of swine manure with cattle manure to raise the moisture level of the manure to a desired level (e.g. 70% to 80%) rather than adding water, recycled or otherwise, for that purpose. This also provides the advantage of adding to the system the high protein from the swine manure without the attendant high cost of evaporating excessive amount of water.

APPENDIX

The composition of the three components extracted from animal manure in accordance with the invention depends on the type of animal manure which in turn depends on what the animals were fed. In this Appendix, representative compositions for the three components are given for manure from cattle fed with typical finishing rations. In the tables below, the silage component from press 26 is indicated by CI; CII represents the high-protein feed supplement from dryer 38, and CIII represents the mostly indigestible soil conditioner from the centrifuge 34.

The cattle which produced the manure from which the CI, CII and CIII samples were extracted were livestock beef cattle. They were fed the following typical finishing ration:

| | % (on wet wt. basis) |
|---|---|
| corn silage | 13% |
| Alfalfa hay | 4.7 |
| Corn | 76.2 |
| Urea - Molasses mixture (30% crude protein) | 2.2 |
| Finisher supplement | 100.0% |

Manure from these cattle was fractionated into the CI, CII and CIII fractions in the following approximate proportions (plus or minus 4) using the process of FIG. 1 with drying but without the vibrating screen 30:

| | |
|---|---|
| CI | 20% |
| CII | 40% |
| CIII | 40% | with the vibrating screen 30, approximate proportions would be

| | |
|---|---|
| CI | 25% |
| CII | 40% |
| CIII | 35% |

The average feed compositions of the CI and CII fractions are given in the following table. Constituents are indicated on a percentage dry weight basis.

| | CI (after six days fermentation) | CII |
|---|---|---|
| Dry matter | 34.4% | 92.2% |
| Protein | 9.0 | 31.8 |
| Crude fiber | 27.5 | 0.4 |
| Ether extract (fat) | 1.8 | 4.8 |
| Nitrogen free extract (NFE) | 50.4 | 37.1 |
| Ash | 11.2 | 25.4 |
| | 99.9 | 99.5 |

The CII component also contained small quantities of minerals such as phosphorous, calcium and potassium which are in the liquid fraction. This further enhances the commercial value of the CII component.

The CIII component was about 57% dry matter. The dry matter comprised about 69% ash products and 31% fine fiber particles. An analysis of the ash products showed the following elements.

| | Percent of Ash |
|---|---|
| Silica ($SiO_2$) | 22.8% |
| Calcium Oxide (CaO) | 4.2 |
| Alumina ($Al_2O_3$) | 36.7 |
| Iron Oxide ($Fe_2O_3$) | 2.6 |
| Magnesium (MgO) | 1.7 |
| Sodium Oxide ($Na_2O$) | 13.5 |
| Potassium Oxide ($K_2O$)) | 3.6 |
| Phosphorous ($P_2O_5$) | 11.5 |
| Sulfate ($SO_4$) | 2.4 |
| | 99.0 |

Trace quantities of other elements make up the balance of the ash.

Manure from swine has been tested using the process of FIG. 1 without drying. Approximate average compositions of the CI and CII fractions from swine manure are given in the following table. Constituents are stated on a percentage dry weight basis.

| | CI | CII |
|---|---|---|
| Dry Matter | 35% | 15% |
| Protein | 18 | 60 |
| Crude fiber | 18 | 0 |
| Ether Extract (fat) | 3 | 8 |
| NFE | 53 | 7 |
| Ash | 8 | 25 |

Feed trials have proven that the silage component (CI) and high-protein feed supplement (CII) can be used in standard feeds for ruminants and/or monogastric animals. The tests summarized below were conducted on CI and CII fractions extracted from the manure of beef cattle fed the control ration described above, using the process of FIG. 1 without the vibrating screen.

Beef Cattle

In tests with cattle where CI was substituted for 100 percent of the corn silage in the normal ration, the average daily gain, average daily consumption and average conversion was slightly higher for the cattle fed the CI as opposed to corn silage.

To test the CII supplement, 29% of the supplemental protein of a standard feed ration was provided by the CII supplement. In this case average daily gain and average daily consumption were slightly less in the case of the CII supplement. The average conversion (digestibility) was slightly greater for the CII.

Comparison of actual gain to estimated gain on the basis of "net energy for production" (NEP) and "net energy for maintenance" (NEM) values of the feeds actually consumed was better than the estimated standard for both the CI and CII rations.

The cattle slaughtered were graded U.S. choice and yielded an average of 65% with no significant differences betweeen the groups as to the rations fed the cattle. Both the CI and CII fed cattle were analyzed for pathogenic organisms and none were found.

Hens

Feed tests were conducted on forty-six laying hens of two strains and ages which were divided into three groups fed diets of zero percent, fifteen percent, and thirty percent of the CII feed supplement, respectively. Egg production, egg quality, and body weight were studied and statistically analyzed with no significant differences being found due to the diet. Feed consumption and conversion did not appear to be affected by treatment. The energy value of the product was calculated at a value of 1100 calories M.E. per pound. This is similar to the energy in West Coast Oats, Brewer's Dried Grains, and dehulled soybean meal (fifty percent protein).

Fish

Tests have also been conducted on rainbow trout in which the CII supplement comprised fourteen percent of the rainbow trout ration. After the second day, the fish accepted the ration and throughout the twenty-week feeding trial, weight gain, food conversion, grams of protein and mortality were within expected limits. Fish receiving the CII ration were more vigorous and active than those receiving a commercial ration.

We claim:

1. A process for extracting feed products from animal manure, comprising:
    forming a manure-water slurry in a first pit and permitting said slurry to ferment;
    separating said slurry into solid and liquid fractions, said solid fraction comprising a silage-like component of undigested fibers and grains, said liquid fraction comprising high protein nutrients and relatively dense indigestible minerals and fiber particles;
    separating said relatively dense indigestible minerals and fiber particles from said high protein nutrients in the liquid fraction; and
    processing said liquid fraction for use as a feed supplement which contains relatively low amounts of indigestible minerals and fiber particles.

2. A process for extracting feed products from animal manure according to claim 1, where the moisture content of said slurry is maintained between 70% and 80%.

3. A process according to claim 1, wherein a fermentable carbohydrate is added to said manure slurry.

4. A process according to claim 1, wherein acid is added to said liquid fraction to cause the nitrogenous compounds in said liquid fraction to form less volatile salts, and further comprising the step of heating said liquid fraction after said indigestible minerals and fibers have been removed therefrom to cause evaporation of water and thereby concentrate the nutrients in said liquid fraction.

5. A process according to claim 4, wherein said acid is sulfuric acid.

6. A process according to claim 4, wherein said acid is phosphoric acid.

7. A process according to claim 5, wherein said liquid fraction is at least partially neutralized with ammonium after evaporation.

8. A process according to claim 6, wherein said liquid fraction is at least partially neutralized with calcium carbonate afer evaporation.

9. A process according to claim 4, wherein the concentrated liquid fraction is dried after partial evaporation of the water in it.

10. A process for extracting digestible material from animal manure, comprising forming a slurry of manure and water, separating said slurry into solid and liquid fractions, said solid fraction comprising a silage-like mixture of undigested fibers and grains, said liquid fraction comprising high protein nutrients and relatively dense indigestible minerals and fiber particles, washing said undigested fibers and grains, extracting a substantial amount of the insoluble minerals and indigestible cellulosic particles within said liquid fraction therefrom, and evaporating at least some of the water in the liquid fraction remaining after removal of said insoluble minerals and indigestible cellulosic particles to provide a concentrated liquid feed supplement including substantial amounts of soluble and insoluble nutrients containing relatively low amounts of indigestible minerals and fiber particles.

11. A process according to claim 10, wherein acid is added to the liquid fraction prior to said evaporating step, said acid forming relatively non-volatile salts with nitrogenous compounds in said liquid fraction.

12. A process according to claim 11, wherein said evaporating step includes depositing the liquid fraction on at least one rotating heated drum.

13. A process according to claim 10, wherein the evaporated water produced during evaporation is used to wash said undigested fibers and grains.

14. A process according to claim 10, wherein the solid fraction from the manure slurry is washed as it is being conveyed to a press.

15. A process according to claim 10, wherein clean water is used to wash said solid fraction as it is being conveyed to said press, and the excess wsh water collected and returned to the pit in which said slurry is formed to maintain said slurry at a preselected moisture content.

16. A process according to claim 10, wherein said manure slurry is separated into its solid and liquid fractions by forcing the slurry under pressure through a screen.

17. A process according to claim 16, wherein said screen is continuously cleaned by a moving knife edge.

18. A process for extracting feed products from animal manure according to claim 11, wherein the slurry is allowed to ferment prior to separation so as to convert non-protein nitrogen in the manure into true protein.

19. A process according to claim 18, wherein a fermentable carbohydrate is added to said manure slurry.

20. A process according to claim 10, wherein the concentrated liquid fraction after evaporation is blended with fodder to provide an animal feed product.

21. A process according to claim 10, wherein the concentrated liquid fraction after evaporation is fermented and then mixed with fodder to provide an animal feed product.

22. A process for extracting feed products from animal manure, comprising:
    forming a manure-water slurry of between 70% and 80% moisture content in a first pit and permitting said slurry to ferment to convert non-protein nitrogen to true protein;

forcing said slurry under pressure against a screen to thereby separate said slurry into solid and liquid fractions;

washing said solid fraction as it is conveyed to a press to provide a silage-like component of undigested fibers and grains;

separating relatively dense indigestible minerals and fiber particles from high protein nutrients in the liquid fraction, adding an acid to the remaining liquid fraction to cause nitrogenous compounds to form salts which are less volatile than said compounds, and thereafter heating said liquid fraction to evaporate a substantial amount of the water in said liquid fraction and thereby yield a high protein feed supplement containing relatively low amounts of indigestible minerals and fiber particles.

23. A process according to claim 22, wherein the liquid fraction remaining after evaporation is blended with plant fodder to provide an animal feed product.

24. A process according to claim 22, wherein the liquid fraction remaining after evaporation is fermented and then blended with plant fodder to provide an animal feed product.

25. A process according to claim 22, wherein water in said liquid fraction is first evaporated in a vacuum evaporator and the concentrated liquid fraction then dried by depositing it on at least one rotating heated drum.

26. A process according to claim 25, wherein the water evaporated in the evaporator is used to wash said solid fraction.

27. A process according to claim 22, wherein the excess water used to wash said solid fraction as it is being conveyed to said press is collected and returned to the pit in which said slurry is formed to maintain a preselected moisture content in said pit.

28. A process according to claim 22, wherein a readily fermentable carbohydrate is added to said manure slurry.

29. A process for recovering feed products from animal manure, comprising forming a manure-water slurry in a first pit and agitating said slurry while allowing debris to settle to the bottom of said pit for periodic removal of the debris;

transferring said slurry to a second pit and permitting said slurry to ferment in said second pit until its pH is about 5 or less;

pressing said fermented slurry against a screen to separate said slurry into liquid and solid fractions;

washing said solid fraction with fresh water and recycling the excess wash water to said first pit to maintain a preselected moisture content in said slurry;

separating insoluble minerals and indigestible fiber particles from high protein nutrients in said liquid fraction;

adding acid to the remaining portion of said liquid fraction containing said high protein nutrients to cause nitrogenous compounds in said liquid fraction to form salts which are less volatile than said nitrogenous compounds; and evaporating water in said liquid fraction to yield a high protein feed supplement containing relatively low amounts of indigestible minerals and fibers.

30. A process according to claim 29, wherein the concentrated liquid fraction after said evaporating step is dried by depositing it on at least one rotating heated drum.

31. A process according to claim 29, wherein said insoluble minerals and indigestible fiber particles are extracted by centrifuging said liquid fraction.

32. A process according to claim 1, wherein said animal manure is a mixture of livestock manures.

* * * * *